(12) United States Patent
Glenn

(10) Patent No.: US 6,795,877 B2
(45) Date of Patent: Sep. 21, 2004

(54) CONFIGURABLE SERIAL BUS TO COUPLE BASEBAND AND APPLICATION PROCESSORS

(75) Inventor: Scott C. Glenn, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 09/998,532

(22) Filed: Nov. 29, 2001

(65) Prior Publication Data

US 2003/0101295 A1 May 29, 2003

(51) Int. Cl.⁷ .................................................. G06F 3/00
(52) U.S. Cl. ........................................... 710/36; 710/66
(58) Field of Search ...................... 710/38, 66; 712/39, 712/35

(56) References Cited

U.S. PATENT DOCUMENTS

| | | | |
|---|---|---|---|
| 4,486,750 A | | 12/1984 | Aoki |
| 5,663,734 A | * | 9/1997 | Krasner ...................... 342/357 |
| 5,666,321 A | | 9/1997 | Schaefer |
| 5,901,074 A | * | 5/1999 | Nakano et al. ............. 364/709 |
| 5,960,035 A | * | 9/1999 | Sridhar et al. .............. 375/219 |
| 5,982,807 A | * | 11/1999 | Snell ........................... 375/200 |
| 6,016,143 A | * | 1/2000 | Heinzman .................... 345/339 |
| 6,148,420 A | * | 11/2000 | Schlater et al. ............... 714/39 |
| 6,154,785 A | * | 11/2000 | Lakhat et al. ............... 709/310 |

FOREIGN PATENT DOCUMENTS

EP   0 492 072 A1   7/1992

OTHER PUBLICATIONS

Virtex Pin Definitions, Jul. 19, 2002, Xilinx, Version 2.8, Table 1 (Note, Virtex FPGA has been before 2001, see reference "V".*
Xiilnx Ships World's Highest Density FPGA, Xilinx, Jul. 31, 2000.*
TMS320C30 Digital Signal Processor, Revised Jun. 1997, www.ti.com.*

* cited by examiner

Primary Examiner—Fritz Fleming
Assistant Examiner—Alan S. Chen
(74) Attorney, Agent, or Firm—Lanny L. Parker

(57) ABSTRACT

A system includes an application processor and a baseband processor that may be configurable to communicate by the transfer of data in a hexadecimal format, an octal format or a decimal format in accordance with programmed bits in a register's data field.

9 Claims, 2 Drawing Sheets

CONFIGURABLE SERIAL BUS TO COUPLE BASEBAND AND APPLICATION PROCESSORS

BACKGROUND

Today's portable communication products utilize circuits that may perform a variety of applications. Some of the new applications are user defined and the more complex applications are even down-loadable. A product's marketplace success may depend on a continual stream of upgrades and modified applications to enrich a product's features and functionality. At the same time, the user expects the products to include high data rate capabilities, sometimes at a reduced product size and cost.

Competing communication products may be based on Code Division Multiple Access (CDMA), Global System for Mobile Communications (GSM), Time Division Multiple Access (TDMA) systems, third generation (3G) systems, among others. As such, applications available for one communication product may not be available for other products without modifications. In other words, an application running on a Digital Signal Processor (DSP) that implements communication protocols for one standard may not properly interface to applications based on another protocol. Thus, there is a continuing need for better ways to allow applications to operate properly with many communication products without significant modifications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
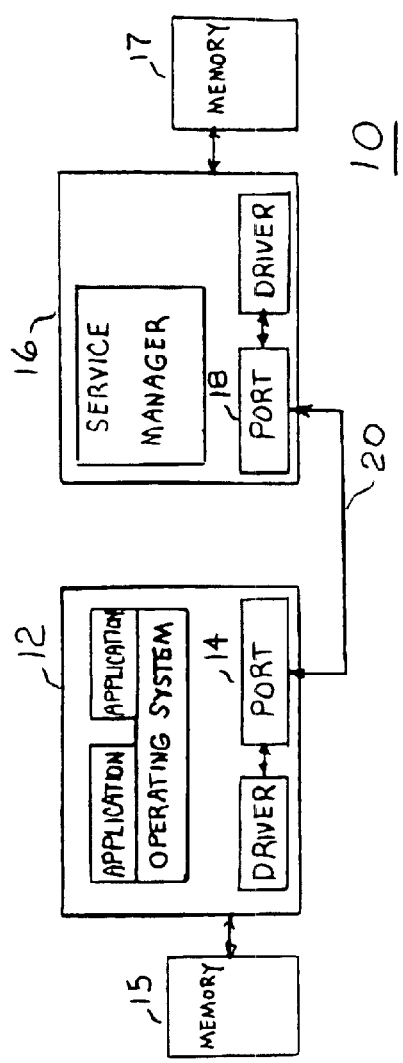
FIG. 1 is a block diagram that illustrates an interface between an applications processor and a Digital Signal Processor.

FIG. 1 is a block diagram that illustrates an interface between an applications processor 12 and a Digital Signal Processor (DSP) 16 of a system 10. Unless specifically stated otherwise, as apparent from the following discussions, it is appreciated that throughout the specification the invention relates to the action and/or processes of manipulating and/or moving data across an interface between the processors. As such, processors 12 and 16 may be a microprocessor, a microcontroller, a Reduced Instruction Set Computing (RISC) processor, an ARM™ core from ARM Holdings in Cambridge, England, a StrongARM™ core or an XScale™ core from Intel Corporation in Santa Clara, Calif., or an embedded core, although the scope of the present invention is not limited in this respect. It should be understood that the blocks for the processors shown in FIG. 1 are illustrative diagrams and that the scope of the present invention is not limited to these examples.

The architecture presented in the embodiments of the invention may have applications to products in portable computing, networking, digital camera applications, wireless technology and a wide range of consumer products based on instrumentation and automotive applications. It should be further understood that the circuits disclosed herein may be used in many systems that include, by way of example only, cellular radiotelephone communication systems, Personal Communication Systems (PCS), modems, two-way radio communication systems, one-way and two-way pagers, Personal Digital Assistants (PDA's) and other hand held devices.

As shown in the FIG. 1, applications processor 12 may include hardware and software specific to selected applications. As such, application processor 12 may be capable of processing functions specific to selected products. By way of example, if system 10 is used in a cellular telephone communication system, then application processor 12 may process algorithms specific to voice recognition. On the other hand, baseband processor 16 may be capable of processing algorithms particular to wireless data communications and RF signaling. As such, baseband processor 16 may process algorithms associated with Code Division Multiple Access (CDMA), Global System for Mobile Communications (GSM), North American Digital Cellular (NADC), Time Division Multiple Access (TDMA), and third generation (3G) systems like Wide-band CDMA (WCDMA), CDMA-2000, and the like.

In some architectures, baseband processor 16 and applications processor 12 may act as respective master and slave processors. No matter what applications may be performed or how applications processor 12 and baseband processor 16 are arranged, interface 20 may provide a high-bandwidth interconnect between application processor 12 and baseband processor 16. Interface 20 may include a data port 14 in applications processor 12 having pad/package terminals that may be electrically connected to the pad/package terminals associated with data port 18 in baseband processor 16. A memory 15 may be connected to applications processor 12 and a memory 17 may be connected to baseband processor 16. Memory 15 and memory 17 may be Static Random Access Memory (SRAM), Dynamic Random Access Memory (DRAM) or nonvolatile memory such as flash.

Figure 2:
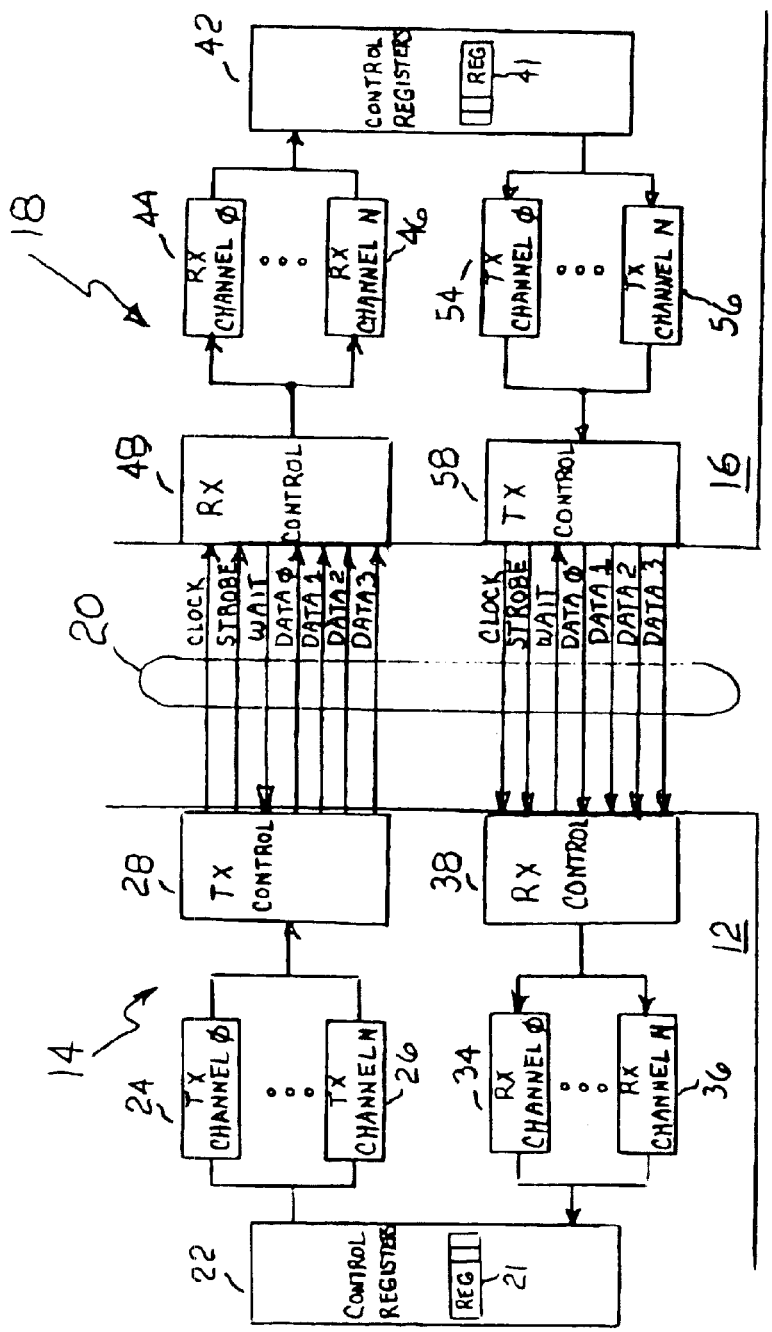
FIG. 2 is a block diagram showing a portion of the applications processor and a portion of the baseband processor in accordance with an embodiment of the present invention.

FIG. 2 is a block diagram showing a portion of applications processor 12 and a portion of baseband processor 16 that may be electrically connected through interface 20. In particular, the figure provides a port 14 that may be integrated with applications processor 12 and a port 18 that may be integrated with baseband processor 16. Port 14 includes storage registers TX channel 24, . . . , and TX channel 26 that provide data that may be transferred through TX control 28 to terminals/pads (pins), across the interconnect of interface 20, to port 18 of baseband processor 16. TX channel 24, . . . , and TX channel 26 are also referred to as channel registers that may provide stored data to the data terminals that have been selected to actively transfer data. The data received by RX control 48 in port 18 may be stored in registers RX channel 44, . . . , and RX channel 46. In a similar fashion, storage registers TX channel 54, . . . , and TX channel 56 in port 18 of baseband processor 16 may provide data that is transferred through TX control 58, across the interconnect of interface 20, to port 14 of applications processor 12. The data received by RX control 38 in port 14 may be stored in registers RX channel 34, . . . , and RX channel 36. Control registers 22 and 42 may provide control signals that affect the transferring, storing and routing of data within respective ports 14 and 18 and across interface 20.

Applications processor 12 and baseband processor 16 may communicate with one another over fourteen signal paths or connections, although this is not a limitation of the present invention. The fourteen signal paths that connect port 14 and port 18 may be thought of as two sets of signal paths. The first set of signal paths (inbound signals) between TX control 28 and RX control 48 include the signals CLOCK, STROBE, WAIT and the data signals DATA 0, DATA 1, DATA 2 and DATA 3. The second set of signal paths (outbound signals) between RX control 38 and TX control 58 also include the additional signals CLOCK, STROBE, WAIT and the data signals DATA 0, DATA 1, DATA 2 and DATA 3. The same signal names signify that the same type of signal may be transferred over the signal path. For instance, in the first set the data signals DATA 0, DATA 1, DATA 2 and DATA 3 may be transferred on signal paths from TX control 28 to RX control 48 and in the second set the data signals DATA 0, DATA 1, DATA 2 and DATA 3 may be transferred on signal paths from TX control 58 to RX control 38. In this particular embodiment, there are four outbound data signal paths and four inbound data signal paths, but the number of inbound and outbound signal paths is not intended as a limitation of the present invention.

A storage register or configuration register 21 in control registers 22 and a configuration register 41 in control registers 42 may be programmed, and thus, define the flow of data across interface 20. By programming configuration register 21, the number of signal paths that actively transfer data from TX control 28 to RX control 48 may be modified. The value of two bits of a data field in configuration register 21 may control the number of data signals DATA 0, DATA 1, DATA 2 and DATA 3 that are active. In other words, configuration register 21 may set all of the data signal paths to transfer data, some of the data signal paths to transfer data or none of the data signal paths to transfer data. Put another way, a portion of the signal paths between port 14 and port 18 may be programmed, as determined by the data in the data fields of the configuration registers, to become inactive. Similarly, by programming configuration register 41, the number of signal paths that actively transfer data from TX control 58 to RX control 38 may be modified. In accordance with one embodiment of the present invention, a register field of two-bits in configuration register 41 may control which of the signal paths that transfer the data signals DATA 0, DATA 1, DATA 2 and DATA 3 are active and which are inactive. Although configuration register 21 and configuration register 41 have been described as registers, the method for storing the data field value is not limited in this respect. Other embodiments of the present invention may use other methods such as a memory or latches for storing data in the register field.

The data values stored in the register field of configuration register 21 and configuration register 41 may be changed under program control in a software routine. Alternatively, the data values stored in the register fields may be initialized during a power-up sequence of applications processor 12 and baseband processor 16. For either method, the number of data signal paths in the first set and the number of data signal paths in the second set may be arranged to transfer data across interface 20. Thus, in accordance with an embodiment of the present invention, an original setting of configuration register 21 and/or configuration register 41 may be modified, and thereby, provide a selectable number of active data signal paths in interface 20. With the register field defined under program control it may be desired that the number of data signal paths be changed based on the application running in processor 12 and/or baseband processor 16.

Figure 3:
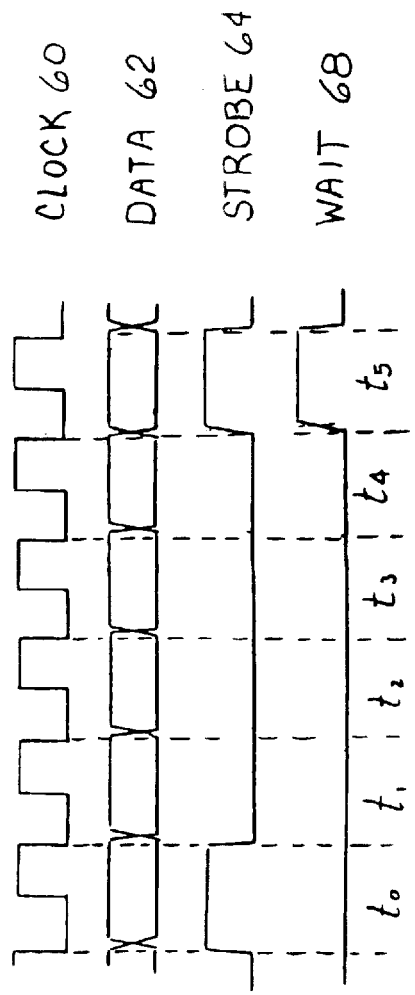
FIG. 3 is a timing diagram for signals that may be transferred between the applications processor and the baseband processor of FIG. 2.

FIG. 3 is a timing diagram showing waveforms for the signals CLOCK 60, DATA 62, STROBE 64 and WAIT 68 during time periods $t_0$, $t_1$, $t_2$, $t_3$, $t_4$ and $t_5$ in accordance with a particular embodiment. Briefly referring to FIGS. 2 and 3, the waveform for the signal CLOCK 60 may be representative of the timing for the signals labeled CLOCK in interface 20; the waveform for the signal DATA 62 may be representative of the signals labeled DATA 0, DATA 1, DATA 2 and DATA 3; the waveform for the signal STROBE 64 may be representative of the signals labeled STROBE; and the waveform for the signal WAIT 68 may be representative of the signals labeled WAIT. As such, the waveforms are representative of the signals that may be transferred between TX control 28 and RX control 48 or the signals that may be transferred between RX control 38 and TX control 58.

In operation, the register fields of configuration register 21 and configuration register 41 may be programmed, and thereby, arrange the number of data signal paths that may transfer data between processor 12 and baseband processor 16. Following the programming, four inbound data signal paths and four outbound data signal paths may be active. Alternatively, less than four data signal paths may be active for the inbound or outbound data signal paths. It should be noted that the number of active inbound data signal paths may or may not match the number of active outbound data signal paths. Thus, data may be transferred between baseband processor 16 and applications processor 12 on the data signal paths that have been programmed to be active.

A configurable speed clock signal, denoted by the signal CLOCK in FIGS. 2 and 3, may be provided by TX control 28 (or TX control 58) and a STROBE signal may be provided to indicate a message starting (or a message ending). A channel number that identifies the channel from which data may be transferred is provided on the data signal paths while the STROBE signal is active. Also, the WAIT signal may be received to indicate that the receive buffer may be full, stopping further data transfers.

By way of example, the register fields of configuration register 21 may be programmed to allow all four of the signal paths that transfer the data signals DATA 0, DATA 1, DATA 2 and DATA 3 to be active. Applications processor 12 may now transfer the hexadecimal data 7FBE over channel 3 to baseband processor 16. While the STROBE signal is active, the four data signal paths provide the data value of 3 during time period to $t_0$ identify channel 3 as transferring data. Following the STROBE signal and during time periods $t_1$, $t_2$, $t_3$ and $t_4$, the data values for the hexadecimal data 7FBE may be provided. The data signal paths may provide a value of zero during the time period $t_5$ to indicate that the transfer of data from channel 3 has completed, or alternatively, a value to identify a new channel from which data may be transferred. Note that this example only calls for data being transferred from applications processor 12 to baseband processor 16, however, the register fields of configuration register 41 may be separately programmed and data similarly transferred over the second set of signal paths between baseband processor 16 and applications processor 12.

By further way of example, applications processor 12 may transfer the octal data 7471 over channel 2 to baseband processor 16. In this example, the register fields of configuration register 21 may be programmed to allow three of the four signal paths to be active. While the STROBE signal may be active during time period $t_0$, the value of 2 may be provided over the three data signal paths to identify the channel from which data is being transferred. Following the STROBE signal, the octal data 7471 may be provided in time periods $t_1$, $t_2$, $t_3$ and $t_4$ from the three terminals connected to the three active data signal paths. The register fields of configuration register 21 (and/or configuration register 41) may also be programmed to allow one or two of the four signal paths to be active for transferring binary data.

As shown and described, a first set of signal paths provide for the transfer of data from application processor 12 to baseband processor 16, while a second set of signal paths provide for the transfer of data from baseband processor 16 to applications processor 12. The register fields of configuration registers 21 and 41 may be programmed to allow a selected number of signal paths to be active. Hexadecimal numbers (base 16) may be transferred when four signal paths are active, octal numbers (base 8) may be transferred when three signal paths are active, and binary numbers (base 2) may be transferred when two signal paths are active. The number of data signal paths selected to be active may be modified based upon the application being run, a bandwidth performance criteria, or a power consumption limit.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:

a storage register to store first and second data values;

first, second, third and fourth data terminals to provide hexadecimal data from the data terminals in accordance with the first and second data values decoded to select four active terminals and the first, second and third terminals to provide octal data in accordance with the first and second data values decoded to select three active terminals;

a terminal to provide a clock signal, wherein the hexadecimal data is changed with the clock signal; and a terminal to provide a strobe signal, wherein an identity of a register to output data is provided at the appropriate data terminals during the strobe signal.

2. The apparatus of claim 1 further comprising a terminal to receive a wait signal, wherein the hexadecimal data is not changed with the clock signal when the wait signal is received.

3. A device, comprising:

a storage register to store a data field value;

a second register to store data;

data terminals to provide data from the second register having a base value as determined by the data field value; and a terminal to supply a strobe signal, wherein an identification value of a register to output data is provided on the data terminals during the strobe signal.

4. The device of claim 3, wherein octal data is provided from the data terminals in accordance with the data field value.

5. The device of claim 3, wherein hexadecimal data is provided from the data terminals in accordance with the data field value.

6. A method, comprising:

selecting data terminals from a group of data terminals to supply data;

supplying a clock signal from a first terminal;

supplying a strobe signal from a second terminal; and providing data at the selected data terminals when the strobe signal is inactive, the data changing in accordance with the clock signal.

7. The method of claim 6, further comprising providing a third terminal that receives a wait signal that keeps the data provided at the data terminals from changing.

8. The method of claim 6, further comprising providing null data from the data terminals when a channel register that stores the data sent to the data terminals is empty.

9. The method of claim 8, further comprising supplying an identification value corresponding to the channel register from the selected data terminals when the strobe signal is active.

* * * * *

UNITED STATES PATENT AND TRADEMARK OFFICE
CERTIFICATE OF CORRECTION

PATENT NO. : 6,795,877 B2
DATED : September 21, 2004
INVENTOR(S) : Glenn

It is certified that error appears in the above-identified patent and that said Letters Patent is hereby corrected as shown below:

Column 4,
Line 61, delete "to $t_0$" and insert -- $t_0$ to --.

Signed and Sealed this

Twenty-fourth Day of May, 2005

JON W. DUDAS
*Director of the United States Patent and Trademark Office*